INVENTOR
Emile Plumat

Jan. 13, 1970  E. PLUMAT  3,489,547
APPARATUS FOR REFINING GLASS
Filed Dec. 7, 1965  8 Sheets-Sheet 4

Fig. 6.

INVENTOR
Emile Plumat
BY Spencer & Kaye
ATTORNEYS

INVENTOR
Emile Plumat
BY Spencer & Kaye
ATTORNEYS

United States Patent Office 3,489,547
Patented Jan. 13, 1970

3,489,547
APPARATUS FOR REFINING GLASS
Emile Plumat, Gilly, Belgium, assignor to
Glaverbel S.A., Brussels, Belgium
Filed Dec. 7, 1965, Ser. No. 512,078
Claims priority, application Luxembourg, Jan. 12, 1965,
47,767
Int. Cl. C03b 5/22
U.S. Cl. 65—347     7 Claims

ABSTRACT OF THE DISCLOSURE

Apparatus for improving the quality of glass produced in a furnace having a tank formed with an outer wall, a dome covering the upper end of the tank, and a sole having an outlet for the flow of molten glass and disposed at the lower end of the tank, the furnace according to the invention being arranged for permitting raw material for the glass to be continually added to the tank at a rate which is equal to the rate at which molten glass passes through the sole outlet while subjecting the entire mass of molten material moving toward the outlet to a downward movement at a uniform velocity in such a manner that this downward movement is not impeded by any ascending currents in the mass.

---

The present invention relates to a method and apparatus for treating glass, and particularly to a method and apparatus for continuously melting raw materials and refining the resulting molten glass.

The present invention is particularly concerned with the production of a continuous supply of high quality molten glass for use in the manufacture of hollow glass objects, cast or drawn glass sheets, laminated glass, etc.

According to current practice, the glass required for such manufacturing operations is produced in tank furnaces having a large horizontal compartment containing a substantial mass of molten glass. The raw materials from which the glass is produced are dumped into the furnace at one extremity of the compartment and the molten refined glass flows out of the other extremity of the compartment and into passages which feed the apparatus in which the glass articles are manufactured. The raw materials introduced into the furnace are dumped on the surface of a molten glass bath which moves horizontally from one end of the compartment to the other. The raw materials are drawn along by the movement of the bath over a relatively great distance in a first, intensively heated zone of the compartment, in which zone these materials become melted. The molten glass continues to move through a second zone of the compartment in which the glass is refined. This second zone must be sufficiently long to ensure that the glass will be satisfactorily refined before it flows out of the compartment and into the passage feeding the manufacturing apparatus.

The thermal efficiency of such furnaces is very low because a large excess of heat must be supplied in order to make up for the heat losses occurring through the compartment walls, which have a relatively large surface area in communication with the atmosphere. Moreover, it is well known that these furnaces have other shortcomings which impair the quality of the glass produced.

The efficiency of these furnaces is further reduced by the tendency of the molten glass in the heating compartment to set up convention currents which permit only a fraction of the heated glass to pass through the outlet of the compartment. This occurs because a fraction of the glass continuously comes in contact with the cold walls of the compartment, where it cools, and then flows, due to convection forces, under the hotter glass layers until reaching the higher temperature central zone of the compartment where it is re-heated and rises. Finally, it emerges to the surface of the molten bath and once again commences to move toward the outlet end of the compartment. Moreover, the manufacturing apparatus only receives a fraction of the molten glass introduced into the passages at the outlet of the furnace because the molten glass which comes in contact with the walls of these passages also cools and is returned to the heating zone of the furnace under the action of convection currents.

The various convection currents thus established not only induce an undesirable heat exchange between the molten glass and the walls, but they also prevent the glass from having a uniform composition throughout the bath. Moreover, these convection currents are quite strong and are actually capable of gradually eroding the walls and the sole of the furnace, which portions are made of refractory materials, causing material to flake off from these surfaces. These flakes are conveyed by the currents into the high temperature zone of the furnace, where they are mixed with the molten glass moving towards the furnace outlet. Since the current of molten glass which moves toward the outlet must supply the material which feeds the manufacturing apparatus as well as the material which constitutes the convection currents, this current of molten glass has a relatively high velocity and therefore drags the particles of refractory material eroded from the furnace walls along before they have had sufficient time to melt and mix uniformly with the molten glass. Even if these particles become wholly or partially melted, they do not mix readily with the molten glass and hence form veins in the resulting manufactured glass products.

The high velocity of the current of high temperature melted glass also tends to drag along unmelted particles of the raw materials, which particles can be incorporated in the finished glass products, causing these products to have a non-uniform composition. In order to avoid this latter difficulty, it has already been suggested to arrange a barrier at the outlet end of the compartment in such a way that it is immersed for a certain distance into the molten bath in order to trap the particles floating near the surface of the bath. However, such a barrier is incapable of trapping the particles and the masses of molten refractory material disposed beneath the surface of the molten bath, and these impurities continue to be delivered to the manufacturing apparatus.

It is also known to utilize vertical furnaces in which the melted glass passes through the lower part of the furnace, through an outlet provided, for example, in the furnace sole. The thermal efficiency of such furnaces is higher than that of the tank furnaces, but the quality of the molten glass produced is no higher because these vertical furnaces also permit relatively strong convection currents to be produced. Specifically, the cold vertical walls of the vertical furnace permit the molten glass in contact therewith to cool, causing this glass to move upward, contrary to the direction of movement of the high temperature molten glass in the axial region of the furnace. Consequently, such vertical furnaces require a special separated compartment in which the actual refining takes place, a re-heating of the glass being therefore necessary prior to refinement, thereby resulting in a loss of part of the advantage gained by the higher thermal efficiency of such a furnace. These vertical furnaces, moreover, have never been capable of melting the large quantities of glass required for supplying apparatus for the continuous manufacture of sheet glass or plate glass, for example. They are most often used for melting small quantities of special glass such as optical glass, for example, which must be highly refined in order to satisfy relatively severe requirements.

It is an object of the present invention to overcome the above-noted drawbacks.

It is a more specific object of the present invention to increase the over-all thermal efficiency of vertical furnaces.

It is another object of the present invention to improve the quality of glass produced in an upright furnace while permitting production to be carried out at a high rate.

It is another specific object of the present invention to prevent convection currents from being set up in the mass of molten glass contained in a vertical furnace.

It is yet another specific object of the present invention to reduce the heat loss occurring at the outer walls of such a furnace.

Broadly stated, these objects are achieved by providing a furnace having a tank formed with an outer wall, a dome covering the upper end of the tank, and a sole having an outlet for the flow of molten glass and disposed at the lower end of the tank, and by continuously adding raw materials for the making of glass to the tank at a rate which is equal to the rate at which molten glass passes through the sole outlet while subjecting the entire mass of molten glass moving toward the outlet to a downward movement at a uniform velocity in such a way that this downward movement is not impeded by any ascending currents in the mass.

Such a result is obtained, according to the present invention, by providing, in a tank having the above-mentioned structure, an inner wall mounted in the tank so as to rest on the sole. This inner wall is spaced inwardly from the outer tank wall and has an upper end which is below the level at which molten glass is to be maintained in the tank. The inner wall divides the tank into an inner compartment enclosed by this inner wall and a peripheral compartment defined by the space between the inner wall and the outer wall. The inner wall has an inner lateral surface in contact with the molten glass in the inner compartment and an outer lateral surface whose entire extent is in contact with molten glass in the peripheral compartment, the inner wall being constructed so that the area of its outer lateral surface is substantially greater than the wall surface area in contact with the tank sole. With such an arrangement, the presence of molten glass in the peripheral compartment serves to thermally isolate the molten glass in the inner compartment from the relatively cold outer wall of the tank. The outlet disposed in the sole is arranged for permitting the outflow of the molten glass contained in the inner compartment. According to an additional feature of the present invention, temperature limiting means, or cooling means, are provided for limiting the temperature of the molten glass present at the center of the inner compartment.

Additional objects and advantages of the present invention will become apparent upon consideration of the following description when taken in conjunction with the accompanying drawings in which.

FIGUGRE 1 is a vertical, cross-sectional view, taken along the line I—I of FIGURE 2, showing one embodiment of the present invention.

In the various figures of the drawings, like elements are designated by the same reference numerals.

Figure 1:
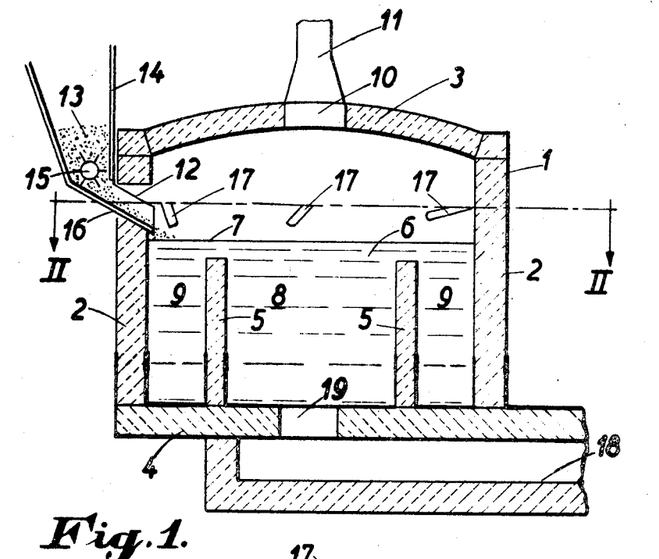
Figure 2:
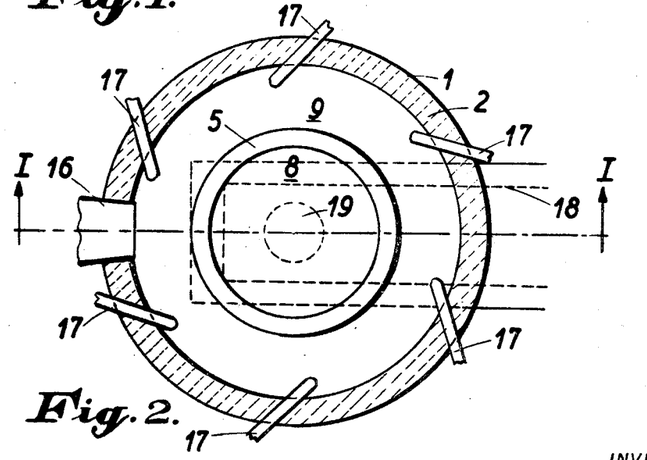
FIGURE 2 is a top cross-sectional view taken along the line II—II of FIGURE 1.

Turning now to the embodiment shown in FIGURES 1 and 2, the furnace of the present invention is shown to comprise a tank 1 having a vertical cylindrical wall 2 of refractory material, a dome 3 covering the upper end of the tank, and a sole 4 closing the lower end of the tank. An inner circular wall 5, which is concentric with the outer wall 2, is mounted on the sole 4 and extends to a height which is slightly below the surface 7 of the mass 6 of molten glass contained in the tank. The inner wall 5 divides the tank 1 into two compartments; an inner compartment 8 enclosed by the inner wall 5 and a peripheral compartment 9 defined by the space between the inner wall 5 and the outer wall 2. The dome 3 is provided at its center with an opening 10 connected to a pipe 11 for the discharge of burner exhaust gases from the interior of the tank. The pipe 11 may be connected to deliver the exhaust gases to a preheater for the furnace, as will be described in detail below. The outer wall 2 is provided with a lateral opening 12 through which the raw materials 13 contained in a hopper 14 are dumped onto the surface 7 of the molten bath 6, in a region directly above a portion of the compartment 9, the delivery of the raw materials 13 being aided by a rotating bladed distributor wheel 15 and an inclined plane 16. A plurality of burners 17 are mounted in the wall 2 and have their outlet ends disposed above the surface 7. Each of the burners 17 is inclined towards the surface 7 and is positioned so that its longitudinal axis lies in a plane which is tangent to a fictitious circle lying midway between, and concentric with, the walls 2 and 5. The burners 17 are oriented so that the movement of the combustion gases expelled therefrom induces a circular motion in the top layer of the mass of molten glass 6 and in the raw materials introduced at the periphery of the mass. The mass of molten glass contained in the peripheral compartment 9 does not take a direct part in the flow of molten glass out of the furnace, but serves to maintain the wall 5 at such a temperature that convection currents can not be generated in the mass of molten glass contained in the inner compartment 8. The molten glass leaving the furnace flows from compartment 8 through an opening 19 provided in sole 4 and into a channel 18 which supplies molten glass to the apparatus for manufacturing various articles.

Figure 3:
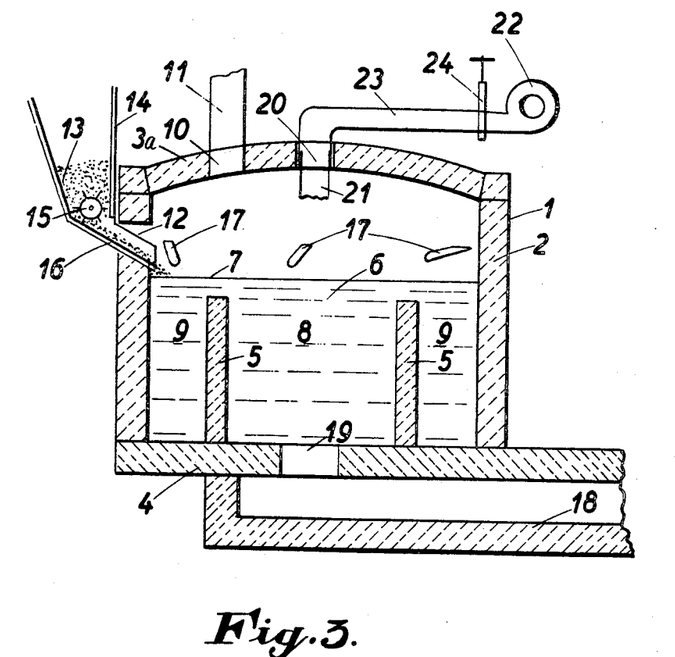
FIGURE 3 is a view similar to that of FIGURE 1 showing a modified embodiment of the present invention.

Turning now to FIGURE 3, there is shown another embodiment of the present invention which is constituted in the same manner as the device of FIGURES 1 and 2. The device of FIGURE 3 differs however, in that the opening 10 and discharge pipe 11 in the dome 3a is displaced to a peripheral portion of the dome and its former central position is occupied by an opening 20 through which passes a pipe 21 connected to the outlet end of a pipe 23. The pipe 23 is provided with a control valve 24 and is attached to a ventilating air blower 22. The height of the outlet end of pipe 21 above the surface 7 of the bath 6 can be adjusted by sliding this pipe in the outlet end of pipe 23. This unit serves to blow cooling air on the central portion of the surface 7 in order to reduce the temperature of this portion of the mass of molten glass.

Figure 4:
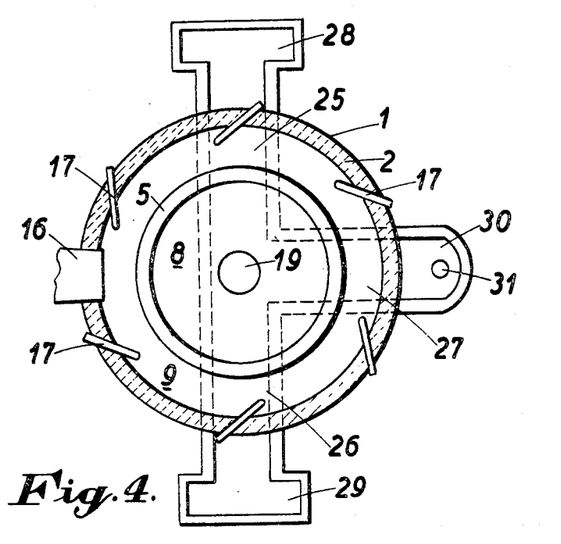
FIGURE 4 is a view similar to that of FIGURE 2 showing another modification of the present invention.

The device shown in FIGURE 4 is also similar to that of FIGURES 1 and 2, with the exception that the opening 19 in the sole communicates with three passages 25, 26 and 27 instead of the single passage 18 of FIGURES 1, 2 and 3. The passages 25 and 26 feed, for example, respective inlets 28 and 29 for two drawn glass manufacturing units, while the passage 27 supplies glass to a compartment 30 which feeds the inlet 31 for a bottle manufacturing machine.

Figure 5:
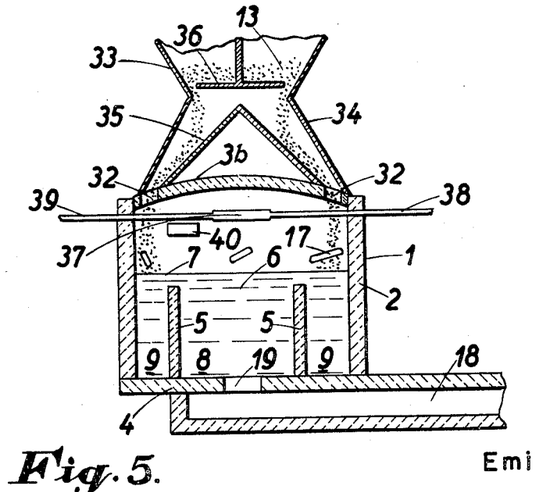
FIGURE 5 is a view similar to that of FIGURE 1 showing yet another modification of the present invention.

The embodiment of the present invention shown in FIGURE 5 differs from those previously shown and described in that no inlet is provided in the wall 2 for feeding raw materials into the furnace. In this embodiment, the raw materials are introduced into the furnace through a series of circumferentially spaced openings 32 provided around the periphery of the dome 3b, the raw materials which pass through these openings 32 being deposited on the peripheral portion of the mass 6. The dome 3b supports a hopper 33 containing the raw materials 13 and provided with a flared base 34 within which is disposed a cone 35 which directs the raw materials toward the openings 32. A rotating plate 36 distributes the materials uniformly on the cone 35.

A cooling unit constituted by a water-cooled or refrigerating fluid cooled disc-shaped box 37 provided with cooling water or refrigerant inlet and outlet pipes 38 and 39, respectively, is disposed above the central portion of the mass 6. The exhaust gases from the furnace are discharged through an opening 40 provided in the wall 2.

Figure 6:
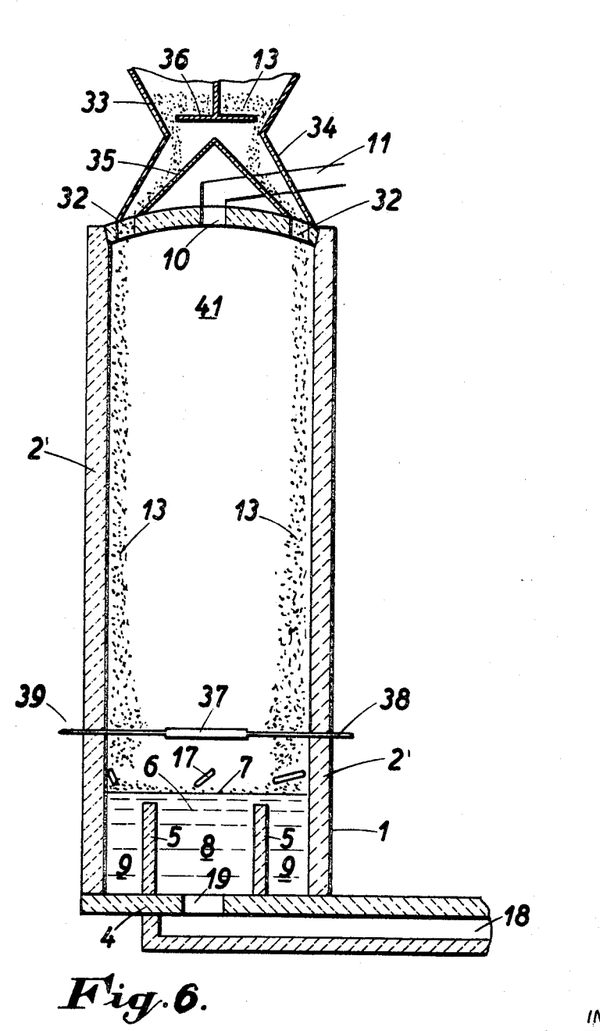
FIGURE 6 is a view similar to that of FIGURE 1 showing still another modification of the present invention.

Turning now to FIGURE 6, there is shown a device which is similar to that shown in FIGURE 5 but which is provided with a vertically elongated wall 2' which permits the exhaust gases rising from the molten mass 6 to preheat the raw materials descending around the periphery of the column 41 formed by the elongation of the outer wall. The dome of FIGURE 6 is identical with the dome 3b of FIGURE 5 and is provided with the raw material introducing arrangement of FIGURE 5 and with a centrally disposed opening 10 connected to an exhaust gas discharge pipe 11 traversing the cone 35 and base 34 of the hopper 33. The unit is so constructed that the exhaust gases passing through pipe 11 do not come in contact with the raw materials passing through the hopper 33. Such an arrangement permits the raw materials descending in column 41 to be preheated by the exhaust gases rising in this column.

Figure 7:
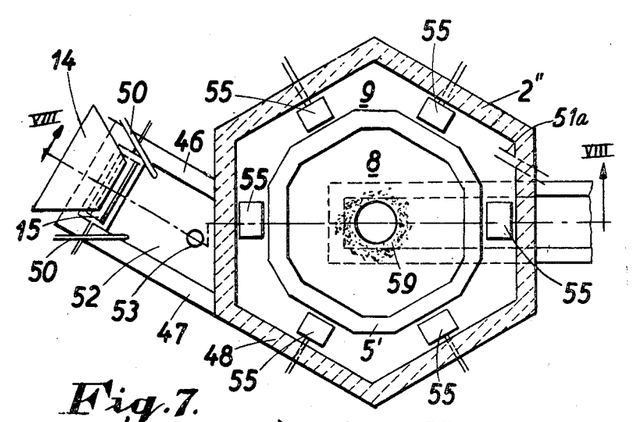
FIGURE 7 is a top cross-sectional view, taken along the plane VII—VII of FIGURE 8, showing another embodiment of the present invention.
Figure 8:
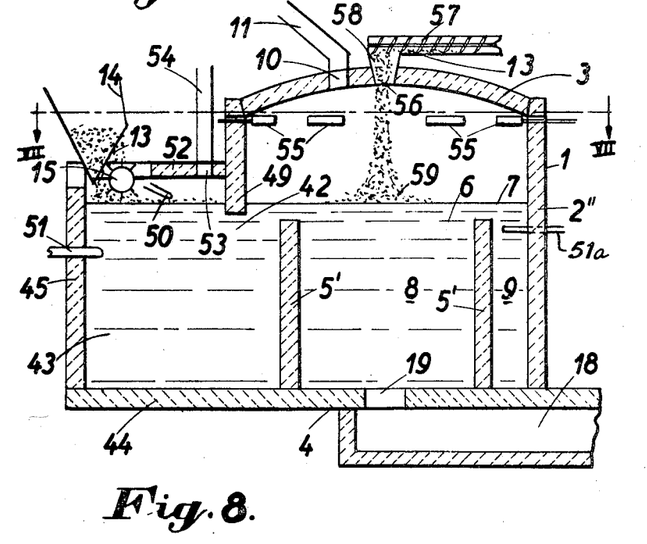
FIGURE 8 is a cross-sectional view taken along the line VIII—VIII of FIGURE 7.

FIGURES 7 and 8 show two views of still another embodiment of the present invention, which differs from the previously-described embodiments primarily in that means are provided for melting the raw materials in a side compartment 43 adjacent the peripheral compartment 9 of the furnace. The walls 2" and 5' of this embodiment are given the form of regular polygons, merely to show one of the forms which these walls may take, it being understood that circular or other regular polygonal configurations can be used equally well in the various embodiments of the present invention. The space enclosed by wall 2" is provided at the lower portion of one side with a relatively large opening 42 through which the peripheral compartment 9 communicates with a side compartment 43 defined by a sole 44 adjoining the sole 4 of the furnace, a frontal wall 45, and side walls 46 and 47. The side wall 47 constitutes an extension of a wall portion 48 of the outer furnace wall 2". The wall portion 49 of wall 2" adjacent compartment 43 is dimensioned so that its lower end extends below the surface 7 of the molten mass 6 in order to prevent particles of raw material 13 which have not become completely melted from entering the furnace region proper. The raw materials 13 contained in a hopper 14 are dumped, with the aid of a rotating paddle wheel 15, on the surface of the molten mass at one end of the compartment 43. A plurality of burners 50 are mounted in the walls 46 and 47, while additional burners 51 are mounted in the front wall 45 below the level of surface 7. The burners 51 are so directed that the movement of the burning fuel emerging therefrom aids the production of the circular motion of the mass of molten glass. A cover 52 of refractory material is disposed between portion 49 of wall 2" and wheel 15 in order to close the top of the compartment 43. The cover 52 is provided with an opening 53 for discharging the exhaust gases produced in compartment 43, a gas discharge pipe 54 being connected in this opening. The dome 3c is also provided with an opening 10 to which an exhaust pipe 11 is attached for the discharge of exhaust gases produced in the furnace. A plurality of heat radiating gas burners 55, the orientation of which is adjustable, are placed in the vicinity of the dome 3c above the region occupied by peripheral compartment 9. A larger number of these burners may be provided and they may be distributed over an even larger area. In place of the heat radiating gas burners, electrical resistance heaters of silicon carbide or of molybdenum silicide may be used.

The dome 3c is also provided with a central opening 56 to which is attached an auxiliary raw material feed device comprising a screw conveyor 57 supplying raw material 13 to a small hopper 58 disposed in the opening 56. The material introduced through the opening 56 forms a circular sheet 59 of relatively cool material on the central portion of the surface of the molten mass within the compartment 8. The regulation of the flow rate of raw material through opening 56 determines the surface extent and thickness of this sheet and thus permits a control of the maximum temperature of this portion of the upper layer of the molten mass.

An additional burner 51a is also mounted in the wall 2" below the level of surface 7 at the opposite side of the compartment 43 in order to maintain the circular motion of the mass of molten glass.

Figure 9:
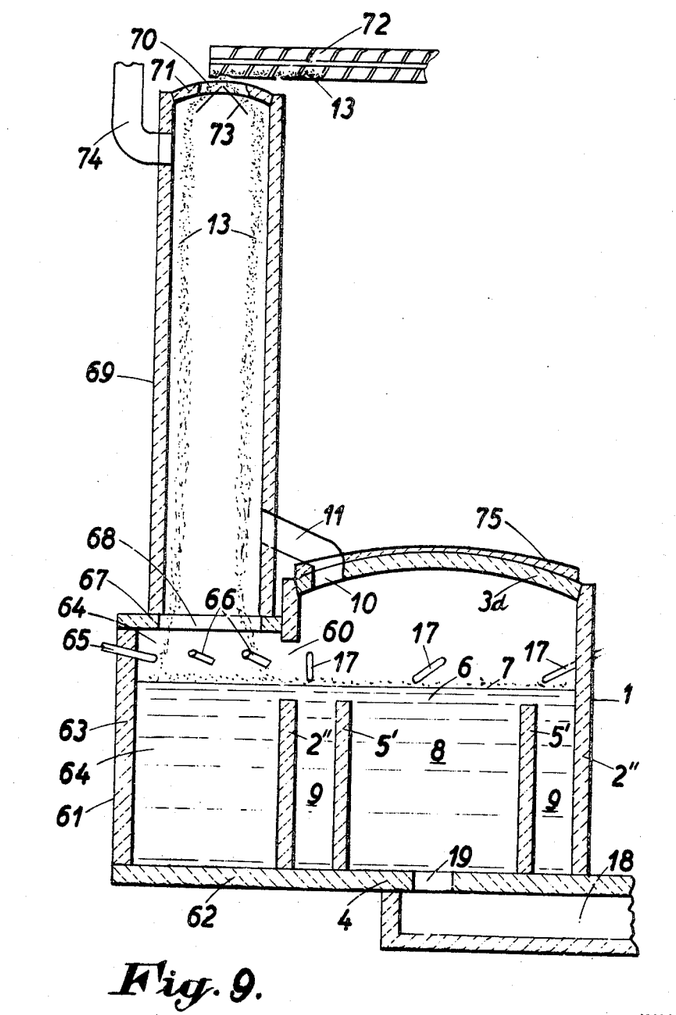
FIGURE 9 is a view similar to that of FIGURE 8 showing a modification of the embodiment of FIGURES 7 and 8.

Turning now to FIGURE 9, there is shown a modified version of the structure of FIGURES 7 and 8. This arrangement differs from that of FIGURES 7 and 8 primarily in that the opening 60 provided for the passage of molten glass between the side compartment 61 and the furnace region enclosed by the wall 2" extends above and below the surface 7 of the molten mass 6 so that the molten glass can pass freely from one side to the other of the wall 2". The side compartment of this embodiment is constituted by a sole 62 which is coextensive with the furnace sole 4, a front wall 63, side walls 64, and one wall portion of wall 2". One or more burners 65 are mounted in front wall 63 in such a way that they extend into the side compartment 61 and are inclined towards the mass of molten glass in a direction corresponding with the direction of the circular motion which is to be imparted to the mass 6. The side walls 64 of compartment 61 are provided with burners 66 which are inclined toward the mass of molten glass and which are directed toward the region enclosed by the wall 2". Compartment 61 is covered by a covering piece 67 which is provided with an opening 68 through which raw materials 13 are introduced into compartment 61. Covering piece 67 carries, in alignment with opening 68, an elongated column 69 through which the raw materials 13 must descend in order to reach opening 68. The raw materials are introduced into column 69 through an opening 70 provided in a dome 71 thereof, by means of a screw conveyor 72 which conveys raw materials 13 to a point where they fall upon a distributing cone 73 disposed in the opening 70. The lower portion of column 69 is provided with an opening to which is attached the outlet end of the gas discharge pipe 11 connected to opening 10 in dome 3d. The exhaust gases from the furnace are thus caused to rise through column 69, thereby effecting a preheating of the descending raw material. The exhaust gas is finally discharged through a second pipe 74 mounted in an opening provided in the upper portion of the vertical wall of column 69. The dome 3d of the furnace is provided with an insulating layer 75 having a thickness which decreases from the edge of the dome to the center thereof. The layer 75 is given such a shape in order to limit the temperature of the central portion of the mass of molten glass by causing more heat to be lost by radiation through the central portion of the dome than from the peripheral portion thereof.

Figure 10:
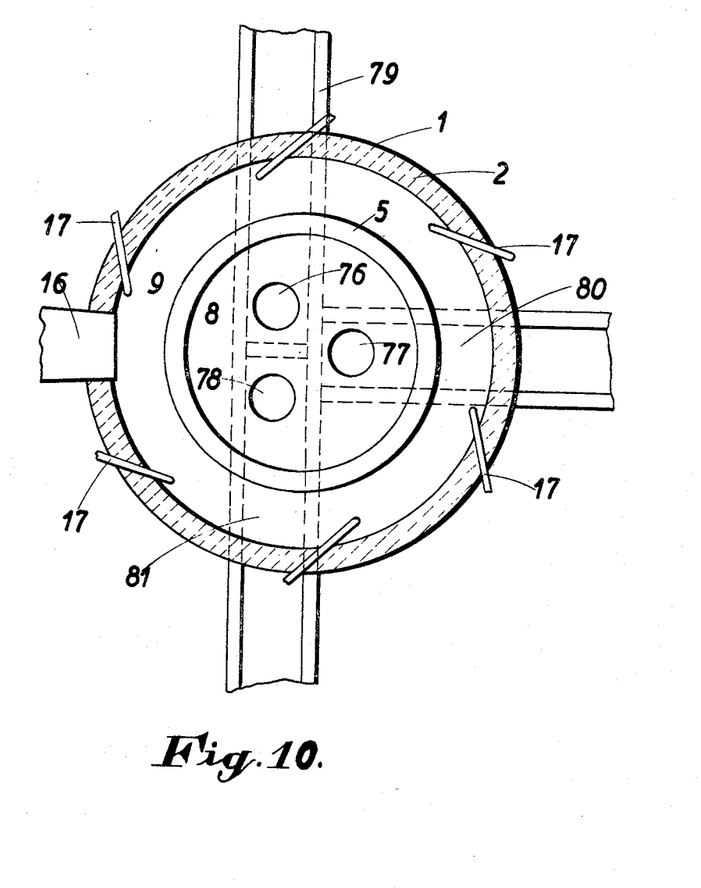
FIGURE 10 is a top cross-sectional view showing a still further modification of the present invention.

FIGURE 10 shows still another modification of the present invention in which the single molten glass outlet 19 is replaced by three outlets 76, 77 and 78, each connected to a respective one of the passages 79, 80 and 81.

Figure 11:
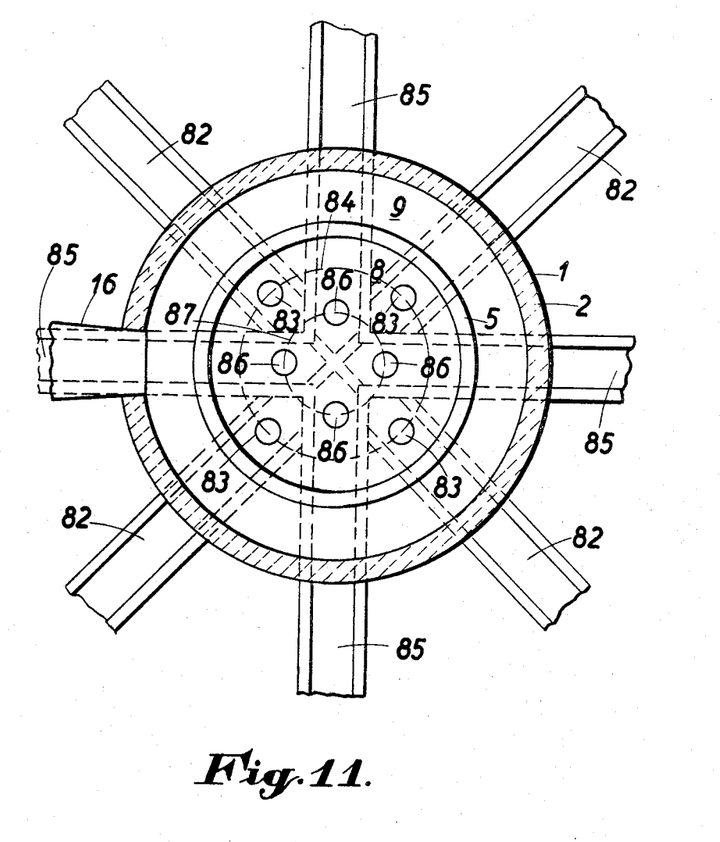
FIGURE 11 is a top cross-sectional view of a yet further embodiment of the present invention.

To indicate that any number of molten glass passages can be fed by the furnace of the present invention, FIGURE 11 shows a modification wherein four passages 82 and four passages 85 are fed by four molten glass outlets 83 and four outlets 86, respectively, formed in the furnace sole. A regular distribution of the molten glass in the passages is effectuated by positioning all of the openings 83 on one circle concentric with the axis of the furnace and all of the openings 86 on a second circle which is also concentric with this axis. As may be seen from the drawing, each of the passages is isolated from the remaining passages.

It may thus be seen that the present invention provides a method and apparatus for producing and refining molten glass in a furnace in which the mass of molten glass contained in the inner compartment of the furnace moves downward toward the sole at a rate which is uniform throughout the entire cross section of the mass, with the result that no ascending currents are created to hinder this uniform downward movement. The absence of such ascending currents, or convection currents, prevents the molten glass at the center of the furnace from moving downward at such a high velocity that it would tend to drag particles of unmelted raw material along with it.

The molten glass produced according to the present invention is effectively homogenized by the creation of a horizontal circular motion in the uppermost layer of the mass contained in the furnace. As the molten glass descends toward the sole of the furnace, this circular motion is converted into a downward helicoidal motion which gradually disappears as the glass approaches the sole of the furnace. This continual conversion from one form of motion to another tends to induce an exchange of material and heat between adjacent horizontal layers of molten glass, thereby further improving the homogeneous nature of the mass.

The uppermost layer of the mass of molten glass is given a circular motion by the action of at least one burner whose flame is suitably directed for producing such a motion. The burner can be positioned in the furnace so that the flame either extends above the surface of the mass of molten glass or is immersed directly in this mass.

According to another feature of the present invention, the temperature existing throughout the mass of molten glass is made still more uniform by the provision of means for limiting the temperature of the central zone of the uppermost layer of this mass so that the temperature of this central zone does not exceed the temperature of the zone surrounding it. This limitation of the temperature of the central zone is effectuated either by cooling this zone, by applying less heat thereto, or by permitting a higher rate of heat dissipation therefrom.

According to an important feature of the present invention, the creation of convection currents is prevented by isolating the descending portion of the mass of molten glass from the relatively cool outer walls of the furnace. It has been found that such a practice permits the uppermost layers of molten glass to be quicklly refined, to be perfectly homogenized, and to have a perfectly uniform temperature. The absence of convection currents permits the molten glass to retain these desirable properties as it descends toward the sole of the furnace.

In the structures of the present invention, the raw materials are deposited in the peripheral zone of the molten mass, or over the entire surface of this mass, or, preferably, on the surface of a portion of the molten mass disposed in a side compartment adjacent the tank. In this latter case, the raw materials, after being melted, are directed towards the tank in a direction which is tangential to the direction of circular motion induced in the mass contained within the tank proper. The raw materials can also be so directed from the side compartment into the tank before being completely melted.

The raw materials are dragged along into, and incorporated with, the circulating mass of molten glass.

In order to induce the desired motion in the raw materials or the molten glass contained in the side compartment, at least one additional burner is provided in this side compartment, which burner is either disposed above the mass of molten glass and inclined towards the surface thereof, or is immersed in the mass, and is oriented so that the motion of the burning fuel ejected by the burner drives the molten glass in the side compartment in the desired direction.

According to a principal feature of the present invention, the portion of the mass of molten glass moving toward the sole is isolated from the relatively cold outer wall of the tank by the presence of a peripheral portion of the mass in a peripheral compartment defined by the space between the outer wall of the tank and an inner wall supported by the sole, spaced inwardly from the outer wall, and extending to a point slightly below the level of the surface of the mass of molten glass.

The temperature of the central portion of the uppermost layer of the molten mass is limited, according to one embodiment of the present invention, simply by placing a gas discharge opening at the center of the tank dome. This opening permits heat radiated from the central zone of the molten mass to be dissipated, while heat radiated from the peripheral regions of the molten mass are reflected back toward the mass by the dome. Such an arrangement permits the mass to be uniformly cooled because the heat lost from the peripheral portion of the molten mass through the outer wall of the tank is compensated by the heat lost from the central portion of the molten mass through the exhaust gas discharge opening.

Such a temperature equalization can also be effectuated, according to another embodiment of the present invention, by the provision of means for cooling the central portion of the uppermost layer of the mass. According to one embodiment, these means comprise a centrally-disposed cooling box through which a refrigerating fluid is circulated, this box being disposed near the surface of the mass of molten glass. Alternatively, these means can be constituted by a device extending through the center of the dome for blowing a cooling fluid towards the central portion of the molten mass. This latter arrangement is particularly effective because it permits the cooling action to be readily regulated.

According to still another embodiment of the present invention, the equalization of temperatures throughout the mass of molten glass is aided by the provision, on the dome, of an insulating layer whose composition or thickness is made non-uniform so as to permit a greater amount of heat radiation through the center of the dome than through the peripheral portion thereof.

The circular motion of the mass of molten material in the tank is produced primarily by a plurality of burners extending through the outer wall and into the tank and oriented so that the direction of motion of the burning fuel ejected from these burners induces the desired motion in the mass. To this end, the burners may be either disposed above the molten mass, in which case they are inclined towards the mass, or immersed directly in the mass, near the surface thereof. These burners also produce the heat for melting the raw materials and the adjustment of their flames, combined with the adjustment of the means for cooling the central portion of the molten mass, permits a uniform temperature to be produced throughout the mass.

An opening is provided either in the outer wall or in the dome of the furnace for discharging the exhaust gases from the burners.

According to another feature of the present invention, the melting of the raw materials is aided by additional heat-radiating gas burners or electric resistance heaters, disposed in the tank above the surface of the mass of molten glass.

The mass of molten glass is continuously replenished by the addition and melting of raw materials, preferably in the form of particles. Such feeding can be readily carried out by suitably adapted, well-known furnace charging systems.

According to a particularly simple embodiment of the present invention, the introduction of raw materials is carried out through an opening provided in the outer wall of the tank, through which opening a suitable feeding device dumps raw material on the peripheral region of the uppermost layer of the molten mass. According to another embodiment of the invention, wherein rising exhaust gases are used to preheat the raw materials, these materials are distributed on the peripheral region of the molten mass through at least one opening provided in the peripheral region of the dome. The deposited raw materials are dragged along by the molten mass and are thus placed in circular motion during their melting. In the case where the raw materials are introduced through an opening in the peripheral region of the dome, this dome is placed at a substantial distance above the surface of the mass of molten glass.

In a more efficient embodiment of the present invention, a side compartment is provided for the melting of the raw materials. This melting is carried out by at least one burner disposed in the side compartment and this side compartment communicates with the interior of the tank through an opening placed in the outer tank wall. In order to ensure that the raw materials are completely melted before entering the tank, the opening in the outer tank wall is so formed that it is disposed completely below the surface of the molten mass so that a portion of the outer tank wall extends below this surface, thereby creating a barrier to the passage of unmelted particles of raw material from the side compartment into the tank. The molten glass produced in this side compartment passes through this opening into the peripheral compartment of the tank. The burner placed in the side compartment is oriented so that the burning fuel ejected therefrom urges the molten glass in this side compartment in a direction which contributes to the circular motion of the molten glass in the tank.

If it is desired to permit some of the raw materials to enter the tank before being completely melted, the above-mentioned opening in the outer tank wall is disposed so that it extends both above and below the surface of the molten mass, thereby permitting the raw materials floating on the surface of the molten glass in the side compartment to pass freely into the peripheral compartment of the tank.

Any well known feeding device can be used for introducing the raw materials into the side compartment. However, according to a preferred embodiment of the present invention, these materials are introduced into the side compartment through an elongated, vertical heat exchange column mounted on the side compartment. This column has an opening which communicates with the gas discharge opening placed in the dome of the tank in order to permit the exhaust gases to rise in the column and to thus preheat the raw materials falling in the column.

According to an additional feature of the present invention, it has been found desirable to dispose an auxiliary raw material introducing device at the center of the dome in order to introduce low temperature raw material directly onto the surface of the central portion of the mass of molten glass. This raw material forms a circular sheet in this region of the surface which acts as a very effective thermal screen for the molten material directly below it.

It may also be noted that the sole of the tank is provided near its center with at least one opening feeding one or more passages which convey molten glass to various compartments feeding the inlets of apparatus for manufacturing glass articles. The sole may alternately be provided with a plurality of openings each of which supplies molten glass to a respective passage supplying glass to the inlet of a separate manufacturing apparatus.

What is claimed is:
1. In combination with glass refining apparatus including a tank having an outer wall, a dome at the upper end of said tank and a sole provided with a molten glass outlet disposed at the lower end of said tank, the improvement which comprises: an inner vertical wall mounted in said tank on said sole and extending substantially vertically therefrom, said inner wall being spaced inwardly of said outer wall and having an upper extremity which is lower than the level at which molten glass is to be maintained in said tank, said inner wall dividing said tank into an inner compartment enclosed by said inner wall and a peripheral compartment defined by the space between said inner wall and said outer wall, said inner wall having an inner lateral surface in contact with the molten glass in said inner compartment and an outer lateral surface whose entire extent is in contact with molten glass in said peripheral compartment and said inner wall being constructed so that the area of its outer lateral surface is substantially greater than the wall surface area in contact with said sole for enabling molten glass in said peripheral compartment to thermally isolate the molten glass contained in said inner compartment from said outer wall, the outlet disposed in said sole being arranged for the passage of molten glass contained in said inner compartment.

2. The apparatus as defined in claim 1 further comprising temperature limiting means associated with said tank for limiting the temperature of the molten glass at the center of said inner compartment.

3. The apparatus as defined in claim 2 wherein said temperature limiting means is constituted by a layer of insulating material disposed on said dome and having a higher coefficient of heat transmission in the region of the center of said dome than in the region of the periphery of said dome.

4. The apparatus as defined in claim 3 wherein said layer is thinner in the region of the center of said dome than in the region of the periphery of said dome.

5. The apparatus as defined in claim 2 wherein said temperature limiting means comprises raw material introducing means disposed on said dome for depositing low-temperature raw materials on the surface of the central portion of the mass contained in said inner compartment.

6. The apparatus as defined in claim 2 wherein said temperature limiting means comprise positive cooling means associated with said tank for cooling the central portion of the uppermost layer of said mass of molten glass.

7. The apparatus as defined in claim 6 wherein said positive cooling means is constituted by a blower unit having an outlet pipe disposed in the central portion of said dome for blowing cooling air on the central portion of the uppermost layer of the mass of molten glass.

References Cited
UNITED STATES PATENTS

| | | | |
|---|---|---|---|
| 2,178,418 | 10/1939 | Brown et al. | 65—335 |
| 2,226,498 | 12/1940 | Koob | 65—135 |
| 2,993,079 | 7/1961 | Augsburger. | |
| 3,224,855 | 12/1965 | Plumat | 65—135 |
| 3,113,856 | 12/1963 | Plumat | 65—335 |

S. LEON BASHORE, Primary Examiner

J. H. HARMAN, Assistant Examiner

U.S. Cl. X.R.

65—134, 135, 339